(12) United States Patent
Moriyama et al.

(10) Patent No.: US 6,378,889 B1
(45) Date of Patent: Apr. 30, 2002

(54) STEERING SKI FOR SNOW VEHICLES

(75) Inventors: Takashi Moriyama; Takuji Nakano, both of Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/538,665

(22) Filed: Mar. 30, 2000

(30) Foreign Application Priority Data

Apr. 5, 1999 (JP) .......................................... 11-098182

(51) Int. Cl.$^7$ ................................................ B62B 17/02
(52) U.S. Cl. .......................... 280/609; 280/28; 180/182
(58) Field of Search .............................. 280/608, 609, 280/28, 845; 180/182, 190; 441/68

(56) References Cited

U.S. PATENT DOCUMENTS

| | | |
|---|---|---|
| 3,190,671 A | 6/1965 | Fabris, S. |
| 3,605,926 A | 9/1971 | Leonawicz |
| 3,675,939 A | 7/1972 | Vik |
| 3,732,939 A | 5/1973 | Samson |
| 3,734,221 A | 5/1973 | Labelle |
| 3,817,544 A | 6/1974 | Labelle |
| 4,077,639 A | 3/1978 | Reedy |
| 4,262,927 A | 4/1981 | Hochstrasser |
| 4,509,771 A | 4/1985 | Nussbaumer |
| 4,826,201 A | 5/1989 | Varan et al. |
| 5,033,572 A | 7/1991 | Zulawski |
| 5,040,818 A | 8/1991 | Metheny |
| 5,165,709 A | 11/1992 | Jacques |
| 5,222,749 A | 6/1993 | Bergstrom |
| 5,251,718 A | 10/1993 | Inagawa et al. |
| 5,340,144 A | 8/1994 | Eleneke |
| 5,344,168 A * | 9/1994 | Olson et al. .................. 280/28 |
| 5,443,278 A | 8/1995 | Berto |
| 5,700,020 A | 12/1997 | Noble |
| 5,964,311 A | 10/1999 | Vamamoto et al. |
| 6,012,728 A * | 1/2000 | Noble .......................... 280/28 |
| 6,105,979 A * | 8/2000 | Desrochers .................. 280/28 |

FOREIGN PATENT DOCUMENTS

| | | |
|---|---|---|
| CA | 211322 | 5/1921 |
| CA | 232374 | 7/1923 |
| CA | 253557 | 9/1925 |
| CA | 650881 | 10/1962 |
| CA | 897747 | 4/1972 |

(List continued on next page.)

OTHER PUBLICATIONS

"Arctic Cat Accessories Catalog"; 1991 Arctco, Inc.
"The Arctic Catalog"Genuine Parts & Accessories for 1994; 1993 Arctco, Inc.

Primary Examiner—Kevin Hurley
(74) Attorney, Agent, or Firm—Knobbe, Martens, Olson & Bear, LLP

(57) ABSTRACT

A steering ski for a snowmobile is disclosed. The steering ski comprises a ski body and a wear bar connected to a ski bracket. The ski bracket is used to attach the ski to the balance of the snowmobile. The ski body also receives a reinforcing member that reinforces a portion of the ski body which is curved upwardly. Reinforcing ribs travel along the length of the ski body on an upper portion of the ski body. The sole of the ski body or lower surface includes a keel that expand in width from a forward-most portion and then decreases in width rearward of a juncture between a snow contacting portion of the ski body and the upwardly-extending portion of the ski body. A wear bar is positioned along the keel and depends below a lowermost portion of the keel rearward of the widest portion of the keel. The wear bar extends into the ski body through a forward aperture and a rearward aperture. The rearward aperture is sized and configured to allow ice chips to be passed through the ski body and slung upward to cool various components of the snowmobile.

27 Claims, 6 Drawing Sheets

FOREIGN PATENT DOCUMENTS

| | | |
|---|---|---|
| CA | 898310 | 4/1972 |
| CA | 916204 | 12/1972 |
| CA | 936197 | 10/1973 |
| CA | 954566 | 9/1974 |
| CA | 966172 | 4/1975 |
| CA | 967626 | 5/1975 |
| CA | 977391 | 11/1975 |
| CA | 981314 | 1/1976 |
| CA | 987707 | 4/1976 |
| CA | 991685 | 6/1976 |
| CA | 1008111 | 4/1977 |
| CA | 1020989 | 11/1977 |
| CA | 2018591 | 12/1991 |
| CA | 2103849 | 2/1995 |
| CA | 2109241 | 2/1995 |
| CA | 2197618 | 8/1997 |
| CA | 2195166 | 7/1998 |
| CA | 2244520 | 1/2000 |
| DE | 1132474 | 6/1962 |

* cited by examiner

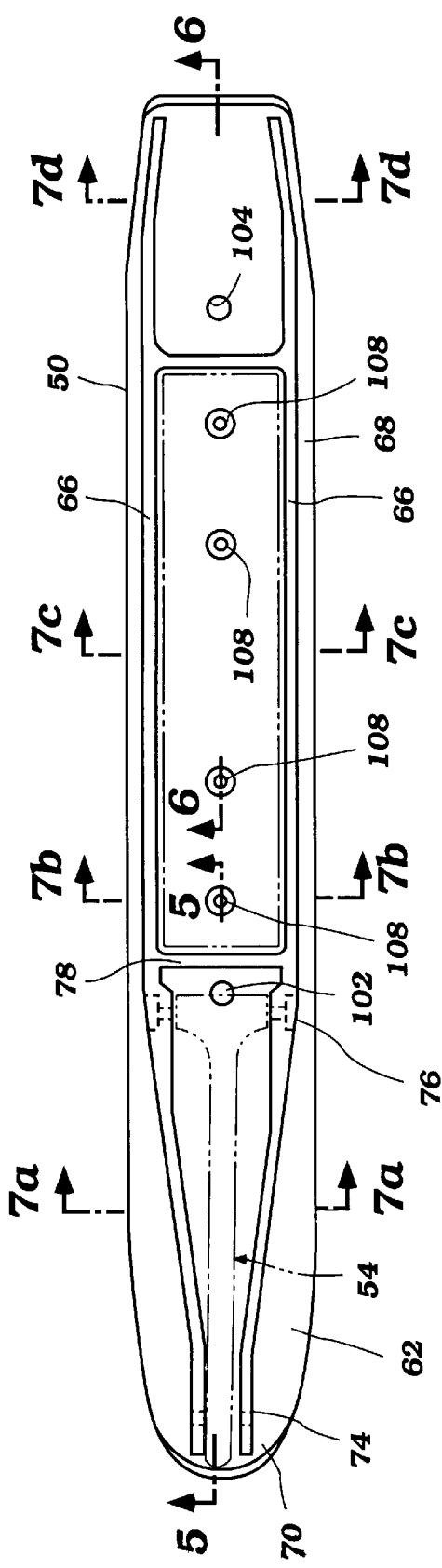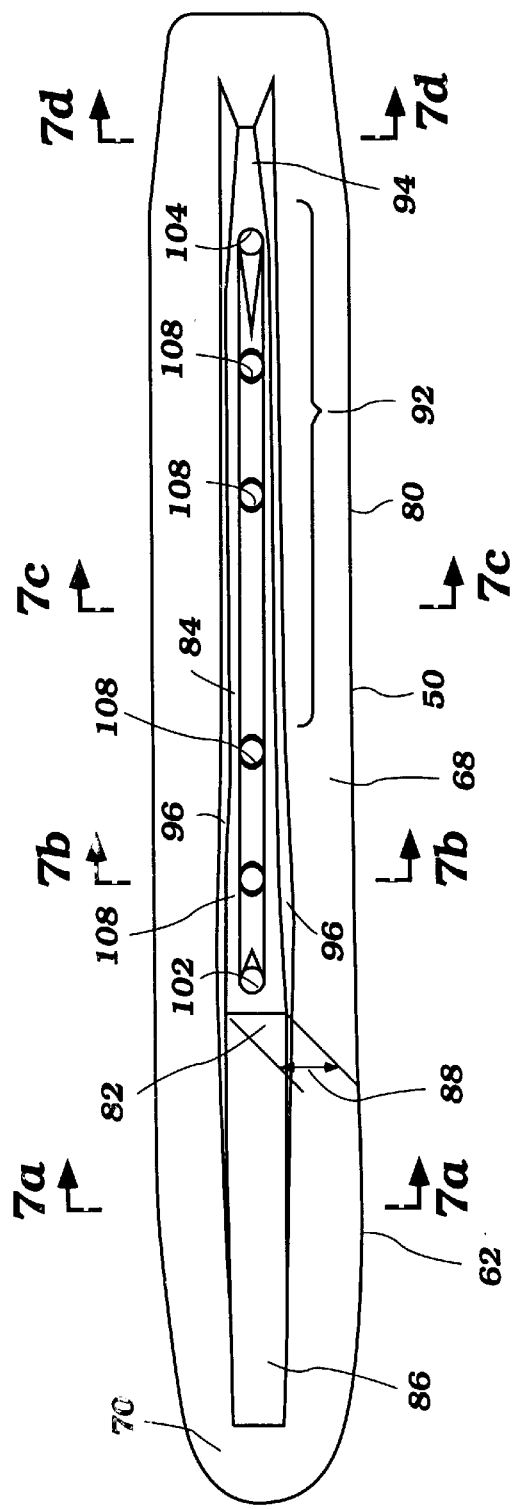
Figure 3
Figure 4

STEERING SKI FOR SNOW VEHICLES

PRIORITY INFORMATION

This application is based on and claims priority to Japanese Patent Application No. 11-98182, filed Apr. 5, 1999, the entire contents of which is hereby expressly incorporated by reference.

BACKGROUND OF THE INVENTION

1. Field of the Invention

The present invention generally relates to skis for snow vehicles. More particularly, the present invention relates to steering skis having improved tracking and component cooling characteristics for such vehicles.

2. Description of the Related Art

The use of snowmobiles and similar snow vehicles has increased in popularity in recent years. These vehicles are being used both for utilitarian purposes and for sport and recreational purposes. The vehicles typically are adapted to travel across snow and/or ice and usually include one or more forward facing skis along with a driven belt track or other propulsion mechanism, such as wheels for instance.

The sport and recreational use of such snowmobiles is being practiced on groomed trails in ski resort areas, for example. On such surfaces, the snowmobiles are generally easily controlled through the use of weight shifting and steering movement of the skis. However, when the snow becomes packed and/or icy, the snowmobile may be less likely to follow the desired track through the snow. In such instances, the snowmobile may become very difficult to handle.

Snowmobile skis typically have an elongated keel that is positioned along the bottom of the ski. The keel acts to increase the bite of the ski in the snow when the ski is turned. Such keels typically leave an impression in the snow corresponding to the profile of the ski and keel. When the snow is wet or compacted, a later following snowmobile ski that happens upon an impression left by a previous snowmobile ski will tend to follow the same track. This condition is generally known as tracking or darting, and is especially prevalent if the temperature has dropped causing wet snow to freeze. Darting forces the snowmobile operator to compensate or correct for the tracking steering forces by oversteering the vehicle to maintain directional stability. This is because the keel of the snowmobile following a track left by a previous snowmobile will naturally situate itself in the previous impression and considerable effort could be required to steer out of such a track. Over time darting can cause the driver to become fatigued from the effort of steering and the handling characteristics of the snowmobile can be greatly decreased.

One solution to the darting problem is to simply increase the total width of the keel. The wide keel would promote steerability and decrease the likelihood of a later-following snowmobile from falling within a track left by the more prevalent narrower keeled snowmobile. Such an arrangement, however, suffers from some obvious drawbacks. First, should such a feature become popular, the use of a wider keel would not have the desired effect of reducing darting. Additionally, widening the keel would result in poor turning performance. This is because the ski is often made of a synthetic resin material that is easily elastically deformed. If the keel is increased in width, the keel could deform more readily and the performance of the ski would be impaired and/or compromised.

A need therefore exists for an improved steering ski. The ski should be capable of reducing darting while also being capable of long-term usage with minimal maintenance. Preferably, the ski would include a reinforcing runner that would be designed to increase the cutting or carving effect of the ski during turning. Additionally, a forward portion of the runner should extend down below the body of the ski such that the wear bar can increase the cutting or carving ability of the ski when in use. Such an arrangement would result form the reinforcement added by the more rigid wear bar relative to the more flexible ski body.

SUMMARY OF THE INVENTION

One aspect of the present invention involves a ski for a snowmobile comprising a body having a substantially horizontal snow contact section and an upturned forward leading portion. A tip is defined at a forward-most end of the leading portion. The leading portion and the snow-contacting portion meet at a junction. A keel depends downward from the body and the keel increases in width from the tip to the junction and decreases in width rearward of the junction.

Another aspect of the present invention involves a snowmobile comprising a body, a pair of skis disposed generally below a forward portion of the body and a drive arrangement disposed generally below a rearward portion of the body. The snowmobile slides on the pair of skis and is powered in at least a forward direction by the drive arrangement. At least one of the skis comprises a passage extending from a lower surface to an upper surface through the ski. The passage is capable of directing ice toward the drive arrangement during forward movement of the snowmobile.

BRIEF DESCRIPTION OF THE DRAWINGS

The above and other features, aspects and advantages of the present invention will now be described with reference to drawings that show a presently preferred arrangement that is intended to illustrate and not to limit the present invention and in which drawings:

FIG. 3 is a top plan view of the steering ski of FIG. 1 having a reinforcing gusset and a related mounting assembly illustrated with phantom lines;

FIG. 4 is a bottom plan view of the steering ski of FIG. 1 having a wear bar removed therefrom;

DETAILED DESCRIPTION OF THE PREFERRED EMBODIMENT

Figure 1:
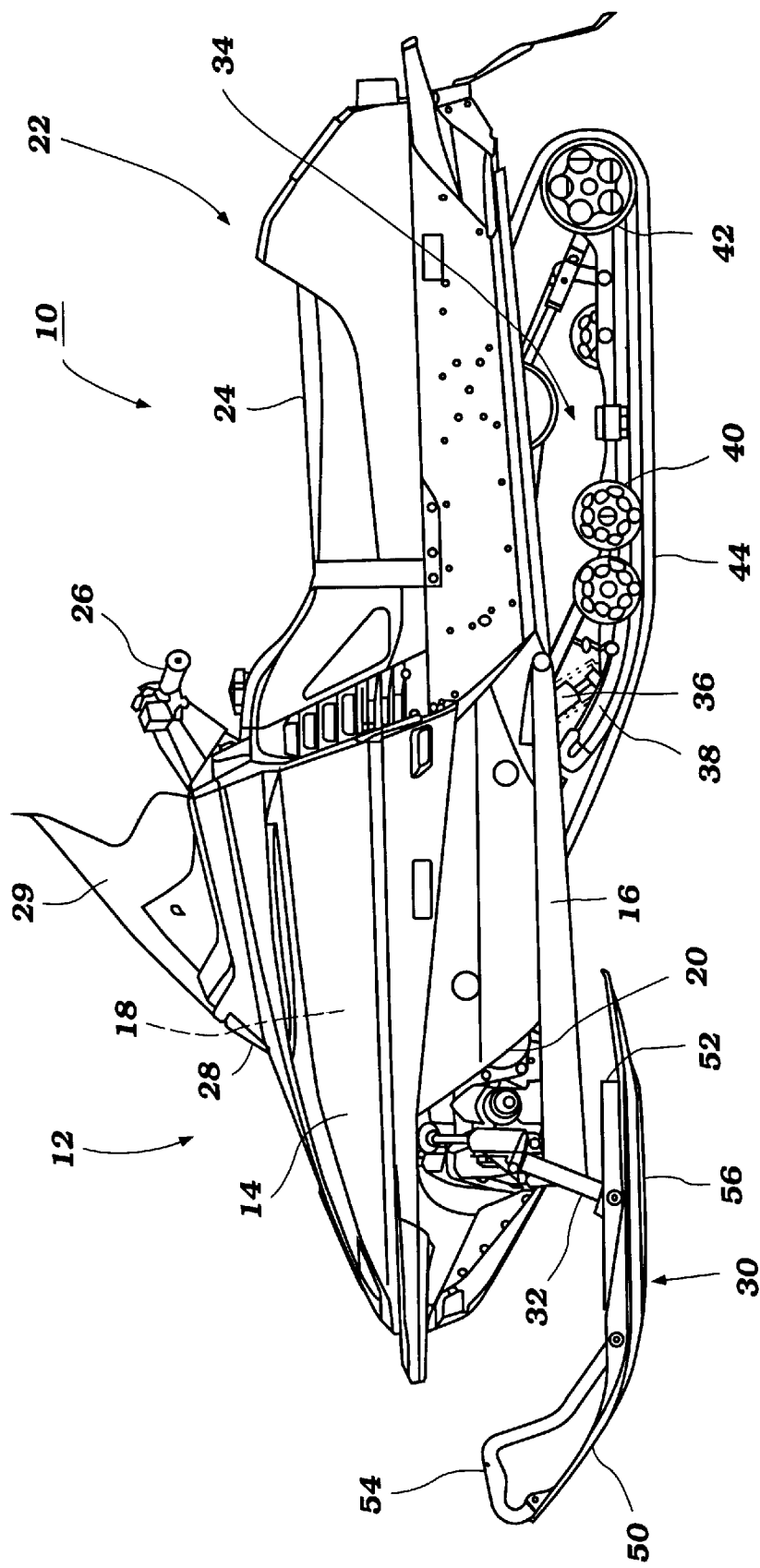
FIG. 1 is a side elevation view of a snowmobile having a pair of steering skis having a steering ski arranged and configured in accordance with certain features, aspects and advantages of the present invention.

With reference initially to FIG. 1, a snowmobile having a pair of steering skis constructed in accordance with an embodiment of the present invention is identified generally by the reference numeral 10. While the present invention will be described in the context of a snowmobile, it should be readily appreciated that the present invention also can be used in a variety of other applications, such as all terrain vehicles having at least one front ski, for instance. The snowmobile 10 includes a body assembly 12 made up of a number of parts which may be formed from suitable materials. The illustrated body assembly 12 includes an upper engine shroud 14 and a lower tray 16, which together define an engine compartment 18. The engine compartment 18 preferably houses an internal combustion engine 20 for powering the snowmobile 10.

The illustrated body assembly 12 further includes a rear portion 22 that accommodates a seat 24, which is adapted to seat one or more riders in a straddle fashion. A handlebar assembly 26 is positioned in front of the seat 24 for operation by the rider.

The illustrated upper engine shroud 14 includes a raised portion 28 located in front of the handlebar assembly 26. The raised portion 28 carries a windshield 29 for affording protection to the rider from wind, snow, branches and other objects when operating the snowmobile 10.

A pair of front skis 30, having a construction to be described, are supported in a manner also to be described at a forward portion of the body 12 with a set of suspension struts 32. The suspension struts accommodate steering movement of the skis 30. The struts 32 preferably are interconnected with a tie rod (not shown) so that they can be steered in unison and at least one of the skis 30 preferably has a steering link (not shown) that is connected to a steering rod (not shown). The handlebar assembly 26 is linked to the front skis 30 through the steering rod and a steering column (not shown) such that movement of the handlebar 26 results in a corresponding steering movement of the front skies 30, as is well known in the art.

A carriage assembly 34 is supported at the rear portion of the body 12 below the seat 24 by a rear suspension system 36. The carriage assembly 34 includes a pair of guide rails 38 that carry a plurality of idler rollers 40, including a main rear idler roller 42.

The guide rails 38 and idler rollers 40, 42 cooperate to form a path around which a drive track 44 is trained. The drive track 44 is driven by an output shaft (not shown) of the engine 20 through a suitable variable belt-type transmission (not shown), as is well known in the art.

Figure 2:
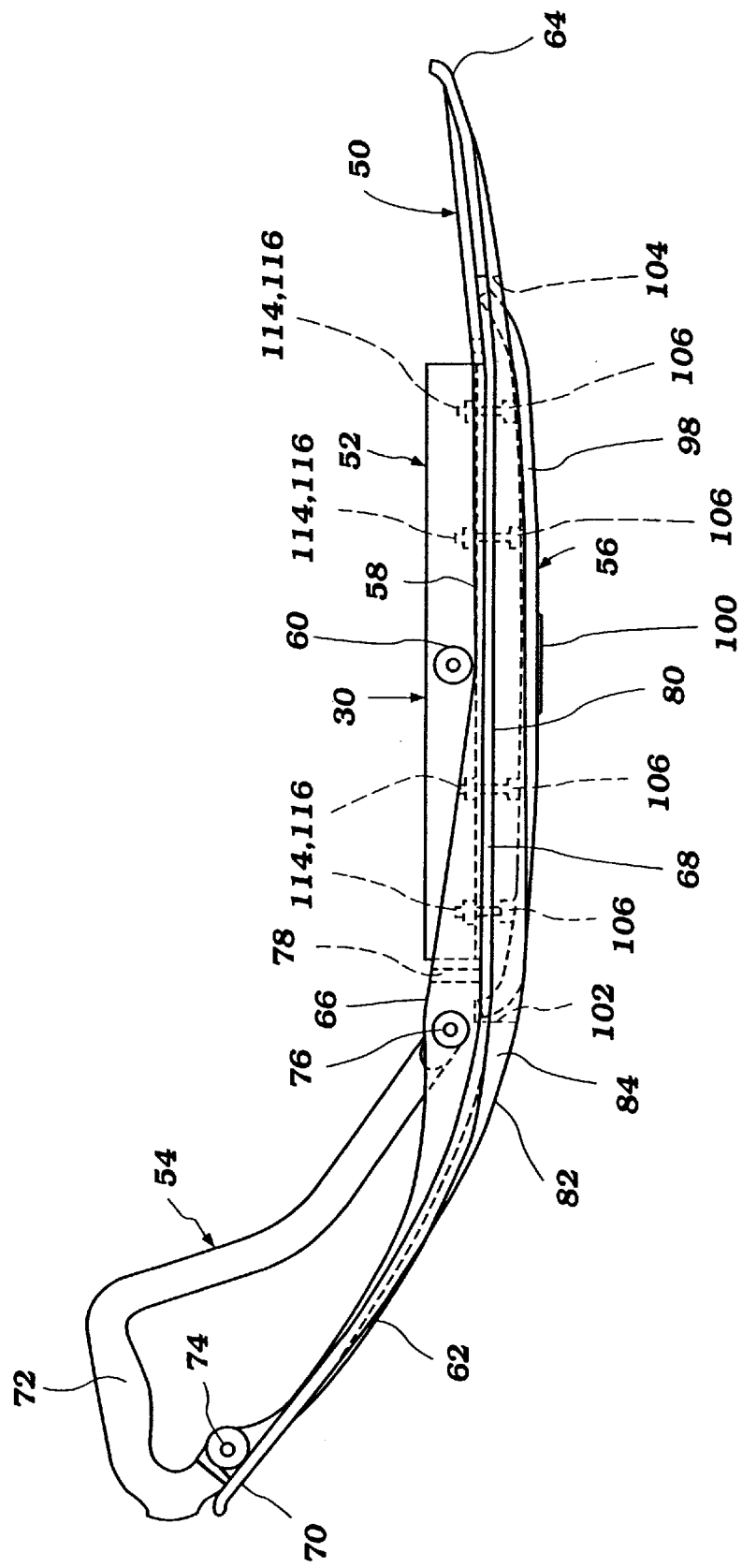
FIG. 2 is an enlarged side elevation view of the steering ski of FIG. 1 having certain internal components illustrated with hidden lines.
Figure 5:
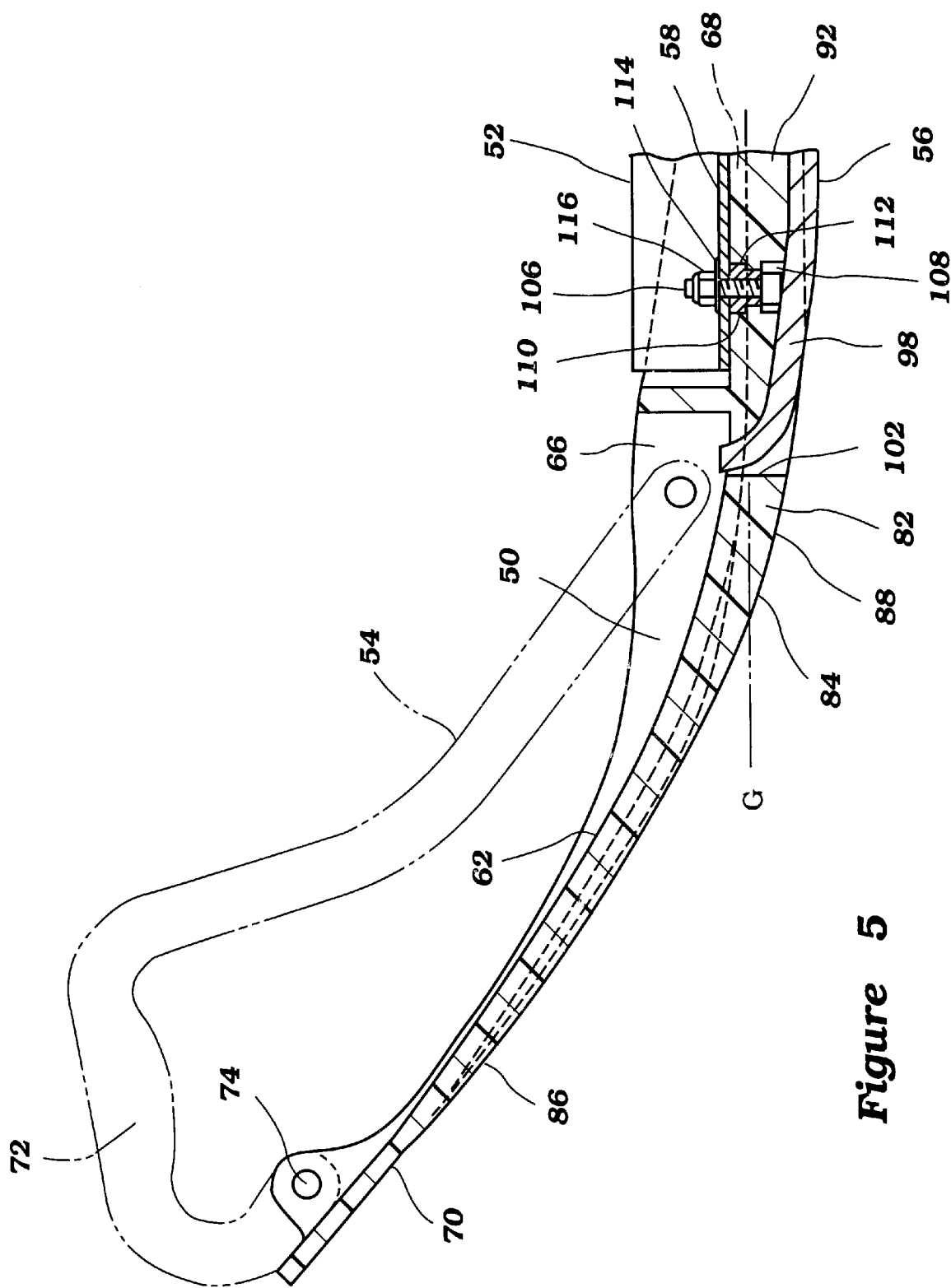
FIG. 5 is an enlarged cross sectioned side elevation view taken along the line 5—5 in FIG. 3 having the reinforcing gusset illustrated with phantom lines and having a portion of the steering ski illustrated with hidden lines.

With reference now to FIG. 2, the illustrated ski 30 generally comprises four components: a ski body 50, a ski bracket 52, a reinforcing member 54, and a wear bar 56. The ski bracket 52 generally comprises a mounting plate 58, which is best illustrated in FIG. 5, to which the balance of the ski assembly is attached. The mounting plate 58 extends in a generally longitudinal direction, which is defined as a direction from forward to rear of the snowmobile. The illustrated mounting plate 58 includes a number of apertures or holes through which the ski body 50 and the wear bar 54 are attached to the ski bracket 52. The illustrated ski bracket 52 also comprises a pair of centrally disposed pivot collars 60. The pivot collars 60 preferably provide reinforcement at the location to which the ski bracket 52 is attached to the strut 32. More preferably, the pivot collars 60 also provide a bearing function similar to that provided by a bushing.

With continued reference to FIG. 2, the ski bracket 52 desirably is shorter than the overall length of the ski body 50, and preferably is located in a central region of the ski body 50. More preferably, the ski bracket 52 is positioned along the ski body 50 such that the portion of the ski body positioned forward of the pivot collars 60 is slightly heavier than the portion of the ski body positioned rearward of the pivot collars 60.

With reference now to FIGS. 2–7, the present ski body 50 will be described in greater detail. Generally speaking, the ski body 50 forms the member upon which the vehicle 10 planes across a ground surface G in a known manner. As illustrated in FIG. 5, the ground G typically is covered by snow and, thus, the ski body 50 has a portion that rides beneath the upper surface of the snow and creates an indentation within the snow in a known manner. The illustrated ski has an overall width that varies with its length. As a general matter, the ski body 50 has an overall width that decreases from front to back. Desirably, a forward portion 62 of the ski body 50, otherwise known as the approach section, snow contacting portion, of the ski 30, extends above the upper surface of the snow such that the ski 30 raises above the ground level G during acceleration in a forward direction. In addition, a trailing edge 64 of the ski body 50 also is curved upward away from the ground G such that the vehicle can move rearward without unnecessarily digging the ski 30 into the snow.

The ski body 50 is preferably manufactured from a lightweight yet resilient material. In one arrangement, the material is a polyethylene plastic. Of course, any suitable plastic or composite materials can be used. In a presently preferred arrangement, the ski body 50 is manufactured from a material having a density of about 0.93 g/cc and a hardness on the shore D hardness scale of 60 to 62. Preferably, this material has an izod impact strength, double notched, of 80 mJ/mm$^2$ or above. In addition, the material preferably has a modulus of elasticity of about 530 MPa. Moreover, the material selected preferably should keep over 80% of its properties after ultraviolet testing according to a test method of JIS D205 WAN-IS at 600 hours. One such material is a UHMW polyethylene that is equivalent to Montell IV 26-32 or Ticona IV 26-32. Both of these materials preferably have 0.15% by weight of a UV stabilizer, such as CHPL17.

The ski body 50 generally comprises a pair of reinforcing ribs 66 that extend along a length of the upper surface ski body 50. More particularly, the illustrated reinforcing ribs 66 extend upwardly away from a top surface of a generally planar sole 68 of the ski body 50. The generally square corners of the sole 68 provide increased cutting action when the snowmobile 10 is sharply turned. Such a feature increases the handling characteristics and maneuverability of the snowmobile. Additionally, at least a portion of the lower surface of the sole 68 includes a pair of outer ridges 69. The ridges 69 extend downward and improve cornering. Preferably, a keel extends further downward than the outer ridges 69.

With continued reference to FIG. 2, the reinforcing ribs 66 extend from within the upwardly turned forward portion 62 of the ski body 50 and have an increasing height relative to the sole 68 of the ski body 50 and a gradual taper along the length of the ski body 50. Generally, the height of the reinforcing ribs 66 is maximized just forward of the bracket 52 and just rearward of an attachment location of the reinforcing member 54 in the illustrated arrangement.

The reinforcing member 54 is attached to a forward-most portion 70 of the sole 68 as well as to a location just forward of the ski bracket 52. Preferably, the reinforcing member 54 provides a handgrip 72 that allows an operator to pull the snowmobile 10 by the skis or to manually reposition the skis when the snowmobile 10 is not being operated. The reinforcing member 54 is attached using threaded fasteners, as is generally to those of skill in the art. Preferably, the reinforcing ribs 66 taper toward one another on the forward portion 62 such that they are separated by a gap generally equal to the thickness of the reinforcing member at the forward-most portion 70 ski body 50. The threaded fastener 74, which is used to attach the reinforcing member 54 to the ski body 50, preferably is tightened to a torque of about 8 to 13 Nm. The rearward threaded fastener 76 extends through a tube that is formed as a portion of the reinforcing member 54 and is preferably tightened to a torque of approximately 15 to 18 Nm. Additionally, the reinforcing ribs 66 are joined by a crossing member 78 proximate the location of the threaded fastener 76. In this manner, the reinforcing member 54 supports the leading portion 62 of the ski body 50.

Figure 6:
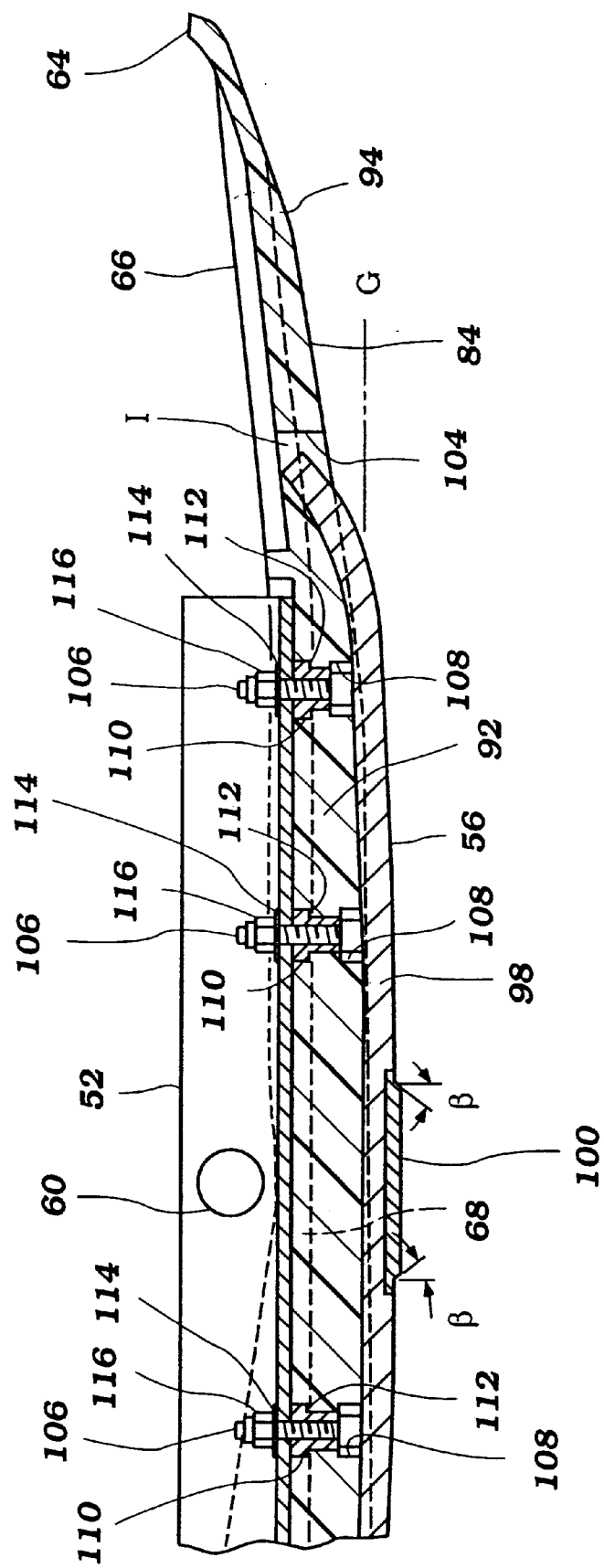
FIG. 6 is an enlarged cross sectioned side elevation view taken along the line 6—6 in FIG. 3 having a portion of the steering ski illustrated with hidden lines.

With reference now to FIGS. 5 and 6, and as explained above, the snow contacts the ski body 50 along the sole 68 at a snow contacting portion 80. It is on the snow contact portion 80 that the majority of the weight of the snowmobile 10 is carried. More preferably, and as illustrated, the snowmobile 10 planes across the surface of the snow on the snow contact portion, and a portion of snow is compacted underneath the snow contact portion. The forward portion 86 of the ski body 50 that contacts the snow is connected to the leading portion 62 at a junction 82. Proximate the junction 82 a keel 84 begins to develop. The keel 84 is similar to that used in watercraft that is used to increase the tracking of the snowmobile 10 through the snow and to enable enhanced cornering abilities. More preferably, and as illustrated, the keel actually begins proximate the forward-most portion 70 of the ski body 50.

With reference now to FIG. 4, the keel 84 has a forward portion 86 that begins along the forward-most portion 70 of the ski body 50. As illustrated, the forward portion 86 of the keel 84 has a narrower width than the widest portion 88 of the keel which is proximate the junction 82 between the snow contacting portion 80 and the forward portion 86 of the keel 84. As illustrated in FIG. 4, preferably the width of the keel 84 expands as the keel moves rearward from the forward portion 86 until it reaches the junction 82. Rearward of the junction 82, preferably the keel 84 decreases in width over its remaining length. The rearmost portion of the keel 94 preferably is narrower than the forward-most portion of the keel 86. Thus, the keel 84 varies in width along its length. FIGS. 7(*a*)–7(*b*) illustrate various sections through the ski 30. With reference to those figures and FIG. 4, the illustrated keel 84 has a first width 88 proximate the junction 82 and decreases in width in both directions. For instance, the keel 84 has a larger contact surface area in section 7(*a*) than in section 7(*b*) and a larger contact surface area in section 7(*b*) than in section 7(*c*). Moreover, the contact surface area in section 7(*c*) is larger than the contact surface area in section 7(*d*).

Figure 7A:
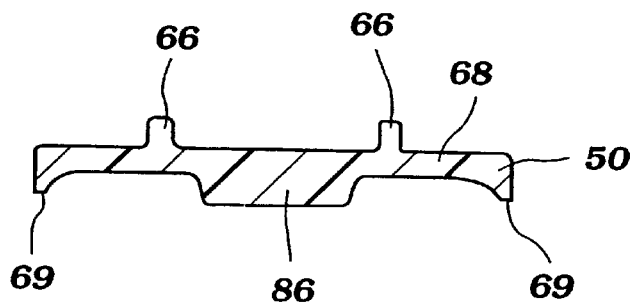
FIGS. 7a–7d are cross sections through the steering ski taken at various locations along the steering ski as indicated in FIG. 3.
Figure 7B:
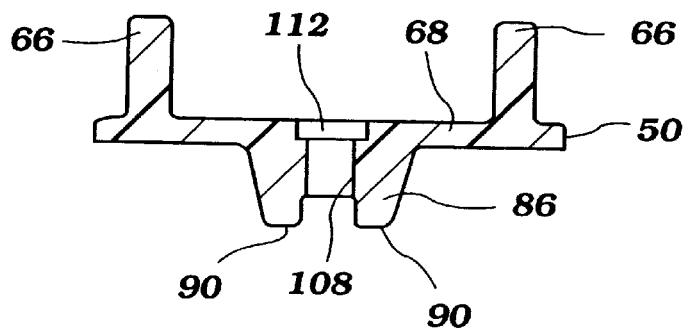
Figure 7C:
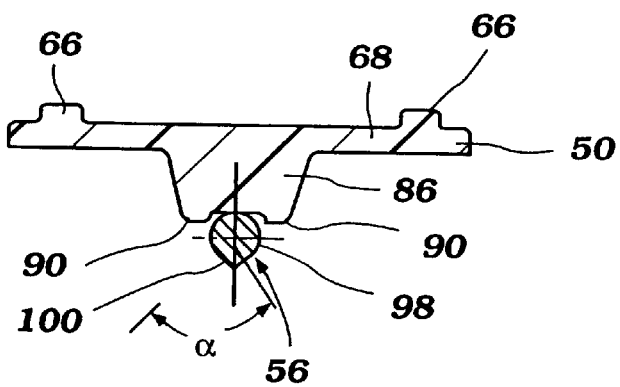
Figure 7D:
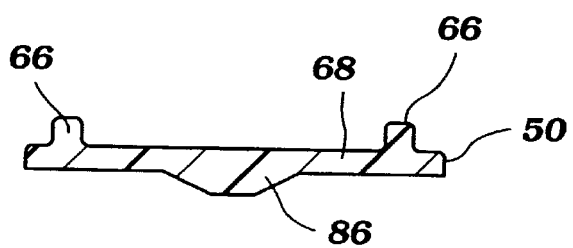

Moreover, the thickness or depth of the keel 86 preferably increases as along the length of the keel 84 from the forward portion 86. Just rearward of the junction 82, the keel has its maximum width or thickness proximate the section b—b 7*b*—7*b* illustrated in FIG. 3, As illustrated in FIG. 7*c*, the keel 86 decreases in thickness or depth from the location proximate FIG. 7*b* until it becomes a mere ripple in the lower surface of the sole 68, as illustrated in FIG. 7*d*. With reference to FIGS. 7(*a*)–7(*d*), the illustrated keel 84 has a progression of heights from tallest to shortest as follows: section 7*b*—7*b*; section 7*c*—7*c*; section 7*a*—7*a*; and section 7*d*—7*d*.

Additionally, the keel 86 includes a pair of raised bosses 90 along at least a portion of its length. Again, these raised bosses 90 decrease in depth or thickness toward a rear portion 92 of the keel 84. In the illustrated arrangement, the raised portion of the rear portion 94 slowly tapers into the surrounding area of the sole 68 at a location rearward of the rearmost portion 94 of the keel 84.

Desirably, and as best illustrated in FIG. 4 and in FIGS. 7*a*–*d*, the keel 84 has a beveled side edge 96 that extends to both lateral sides of the keel 94 along a substantial portion of the keel. Preferably, the beveled edges 96 begin just rearward of the forward-most portion 86 of the keel 84 and continue even after the rearmost portion 94 of the keel 84. These tapered edges increase the contact surface area between the ski body 50 and the snow. In addition, these sloping faces 96 improve the handling and maneuverability of the vehicle 10. Preferably, the slope of the sloping faces 96 is at its minimum proximate the rearmost portion 94 of the keel 84 and again just rearward of the junction 82 in the vicinity of the second hole which will be described below. Thus, the illustrated sloping face 96 has a decreasing slope from the front end of the keel 86 rearward toward the junction 82. Rearward of the junction 82, the sloping faces 96 have a slope that first increases toward the rear keel portion 92 and then decreases toward the rear end of the keel 94. This variable sloping face helps improve the tracking and reduce the darting of the snowmobile 10. Preferably, the overall dimension of the keel 84, which includes the outer edge of the sloping faces 96 (i.e., the intersection between the sloping face 96 and the sole 68) continues to expand rearward of the maximum width location for the keel 84. More particularly, in one arrangement, the overall width of the sloping faces and keel 84, 96 increases rearward of the junction 82 and then contracts to an overall dimension roughly the same as the width of the keel proximate the junction 82. The overall dimension then tapers toward the rearmost portion 94 of the keel 84.

As indicated above, the ski 30 also comprises a wear bar 56. The wear bar generally comprises a host bar 98 and a rigid insert, such as a carbide insert, 100. With reference now to FIG. 2, it is seen that the host bar 98 extends along a substantial portion of the ski body 50 along its sole 68. The inserts 100 are positioned proximate a central portion of the host bar 98 in a manner which will be described below. The host bar 98 extends upward through a hole 102 located at the forward-most end of the host bar 98 and also extends upward through a hole 104 located at a rearward-most portion of the host bar 98. Preferably, and as illustrated in FIG. 2, the forward portion of the host bar 98 is disposed above a lower surface of the ski such that the lower surface protects the forward portion of the host bar 98. In the illustrated arrangement, the host bar 98 is advantageously recessed within a central portion of the keel 84 between a pair of bosses 90. The host bar 98 is also provided with a plurality of threaded fastening studs 106. The studs preferably are connected to the host bar 98 in any suitable manner. In one arrangement, the studs 106 are welded fast to the host bar 98. In other arrangements, the studs may be integrally formed with the host bar or may be drilled and tapped and connected through to the host bar by a threading engagement. Of course, other mounting arrangements may also be possible.

The sole 68, or ski body 50, is provided with the forward hole 102 and the rearward hole 104. As illustrated, the forward hole 102 generally lies beneath the ground plane G while the rearward hole 104 lies above the ground plane G. Such an arrangement results in an advantageous cooling arrangement. More particularly, due to the location, sizing and placement of the rearward hole 104, ice chips that are encountered as the snowmobile 10 is moved forward through a bed of snow can be urged upward through the opening indicated by the letter I in FIG. 6. The ice chips being moved upward through this location are expelled upward or shaved upward by the ski 30 and thrown onto components of the drive mechanism requiring cooling. As used herein, ice chips is meant to include snow, snow and ice mixtures and ice as well as melted or melting ice or snow. Thus, the illustrated design results in improved cooling of various features of the drive assembly.

The wear bar 56 is attached to the bracket 52 using a resilient mounting. More particularly, the studs 106 that are attached to the host bar 98 of the wear bar 56 are passed upward through holes 108 that are formed in the ski body 50. The holes are best illustrated in FIGS. 3 and 7b. As illustrated in FIG. 7b, the hole 108 is preferably stepped such that it is formed with a counter bore portion. The stepped configuration allows a square headed bolt to be used as the mounting stud 106. The square headed bolt 106 then is welded to the host bar 98. Of course, as described above, various mounting arrangements also can be used.

The hole 108 also includes a counter bore located on the opposite end of the hole. Thus, a shoulder is located on both ends of the hole 108. A resilient sleeve or bushing 110 can be positioned within the upper counter bore 112. The bushing preferably is resilient and is sandwiched between the ski body 50 and the mounting bracket 52. The resilient member both absorbs shocks and isolates the bracket 52 from at least a portion of the vibrations experienced by the ski body 50. In one arrangement, the ski body has a total of six (6) apertures 108 through which bolts or studs 106 are passed to connect the wear bar 56 to the ski 30. In the illustrated arrangement, however, a total of four (4) apertures are used. It should be appreciated, therefore, that any number of apertures can be used so long as the wear bar 56 is properly secured to the ski 30.

In addition, the hole 102 has a teardrop configuration such that the host bar 98 does not have to turn abruptly in order to enter into the hole. Such an arrangement reduces the fatigue on the wear bar during use, as well as uses the manufacturing and assembly as well as the replacement of the wear bars 56.

Similarly, the opening 104 has an elongated teardrop shape. However, the opening 104 also is formed as an elongated slot such that an opening is defined rearward of the portion of the opening 104 filled by the wear bar 56. As described above, this opening rearward of the wear bar 56 advantageously results in cooling ice chips that are introduced above the plane of the ski 30 and thrown upward into various components requiring cooling.

The studs 106 receive a flat washer 114 and a nylon nut, or any other suitable nut, 116. This mounting arrangement secures the wear bars 56 to the ski 30. It is anticipated, however, that the wear bar 56 can include apertures that are threaded such that a threaded rod could be extended down into the apertures and tightened in order to fasten the wear bar 56 to the ski 30. In addition, it should be appreciated that the use of one or more slots rather than the hole 108 would ease an alignment in mounting of the wear bar 56. Moreover, the ski body 50 preferably includes bosses that substantially surround the holes 108 to reinforce the holes 108. Such an arrangement is not shown, however, it should be understood by those of ordinary skill in the art to be an advantageous configuration. The nuts should be tightened onto the studs 106 to a torque of approximately 18 to 23 Nm. Such an arrangement ensures the connection while also allowing the nuts to be removed for replacement of the wear bars. More preferably, the forward-most and rearward-most, as well as the innermost two fasteners should be tightened to this degree of torque In arrangements in which there are six fasteners arranged in two groups of three, the intermediate fastener of the forward group, as well as the intermediate fastener of the rearward group, should be tightened to a torque of approximately 8 to 13 Nm.

As discussed above, the host bar 98 includes a chip 100. The chip preferably has a 90° included angle defined at its lowermost edge. This angle can be varied, however, to affect the handling characteristics of the ski 30. The point defined by the two sloping faces that define the 90° angle is preferably offset from the center of the rod by no more than about about 0.5 mm. More preferably, the chip 100 preferably has a side dimension of 3.2 mm and the chip is a square in cross section. While the diameter of the rod may be approximately 0.4375 inch in diameter, or roughly 11 mm, the total height of the rod and chip combination is approximately 12.8 mm in the preferred arrangement. Moreover, the rod 98 preferably includes a reinforcing weld bead of approximately 0.5 mm on both sides of the chip. The chip 100 preferably extends along approximately 4–10 inches of a central portion of the illustrated host rod 98. In some arrangements, two or more chips may be aligned end-to-end to form the total chip 100. In one such arrangement, three chips are arranged end-to-end with the middle chip have a different hardness than the two end chips. Additionally, the two end chips each have an end that is tapered to an angle of about 45°. This tapering provides a knife edge at a forward and rearward portion of the chip 100. Preferably, the chip is manufactured from carbide or a similar hardened material. The chip 100 desirably is located directly beneath the pivot of the saddle or bracket 52. In this manner, the chip 100 is most likely to be in contact with the snow surface. As is known, the chip is used to break through or to cut when riding on ice or a similar hardened snow surface.

It should also be noted that the wear bar 56 extends downward below the lowermost surface of the ski body 50 including the keel 84 at a location just rearward of the junction location 82. Such an arrangement improves the tracking of the ski over hardened or compacted snow surfaces. In addition, such an arrangement improves the carving ability of the ski during turning actions of the snowmobile 10. It should also be noted that the rearmost portion of the wear bar terminates just upward of the lowermost surface of the keel 84. In other words, the rear portion of the wearbar 56, which is bent upwardly toward the hole 104, has a lowermost end that just barely is placed within the hole in the illustrated arrangement. This upward bend reduces the likelihood of damaging the rearward portion of the wear bar 56 while also increasing the ability of the snowmobile 10 to be backed or moved rearward without unnecessary dragging caused by the end of the wear bar 56.

Although this invention has been described in terms of a certain preferred arrangement, other arrangements apparent to those of ordinary skill in the art also are within the scope of this invention. Various changes and modifications may be made without departing from the spirit and scope of the invention. Accordingly, the scope of the invention is intended to be defined only by the claims that follow.

What is claimed is:

1. A ski for a snowmobile comprising a body having a substantially horizontal snow contacting section and an upturned forward leading portion, a tip being defined at a forwardmost end of said leading portion, said leading portion and said snow contacting portion meeting at a junction, a keel depending downward from said body, said keel increasing in width from said tip to said junction and said keel decreasing in width rearward of said junction.

2. The ski of claim 1, wherein said keel has a first width defined at said junction, a second width defined proximate said tip, a third width defined proximate a rearmost portion of said keel and a fourth width defined between said first width and said third width, said second width being greater than said second width.

3. The ski of claim 2, wherein said second width is greater than said third width.

4. The ski of claim 2, wherein said second width is greater than said fourth width.

5. The ski of claim 4, wherein said second width is greater than said third width.

6. The ski of claim 1 further comprising a wear bear, said wear bar extending along said body rearward from proximate said junction.

7. The ski of claim 6, wherein said wear bar is mounted within a groove defined between two bosses defined along said keel.

8. The ski of claim 7, wherein said keel has a first height defined at said junction, a second height defined forward of said junction, a third height defined at a rearmost portion of said keel and a fourth height defined between said junction and said rearmost portion, said first height being greater than said fourth height.

9. The ski of claim 8, wherein said first height is greater than said second height.

10. The ski of claim 9, wherein said second height is less than said fourth height.

11. The ski of claim 1 further comprising a wear bar attached to a lower surface of said body, said body comprising a mounting aperture through which a forward portion of said wear bar extends, and said mounting aperture being positioned proximate said junction.

12. The ski of claim 11, wherein said keel extends downward from said lower surface of said body a first height and said wear bar has a lowermost surface that extends downward from said lower surface of said body a second height, said first height being greater than said second height proximate and slightly rearward of said mounting aperture.

13. The ski of claim 1 further comprising a wear bar attached to a lower surface of said body, said body comprising a mounting aperture through which a rearward portion of said wear bar extends, an ice passage being defined alongside said wear bar through said mounting aperture.

14. The ski of claim 1 further comprising an ice passage extending through said ski body, said ice passage being defined through a rear portion of said keel.

15. The ski of claim 14, wherein said ice passage extends at an angle relative to a lower surface of said ski.

16. The ski of claim 15, wherein said angle results in a rearward trajectory for ice moving through said aperture from a lower side of said ski to an upper side of said ski.

17. The ski of claim 1 further comprising a pair of side edges that depend downward from at least a portion of said ski.

18. The ski of claim 17, wherein said side edges have a height at said junction that is less than a height of said keel at said junction.

19. The ski of claim 1, wherein said ski body tapers in width from said junction to a rearmost portion of said body.

20. The ski of claim 19 further comprising a wear bar that extends along a portion of said body, said body having a first width defined forward of said wear bar, a second width defined along a portion of said wear bar and a third width defined rearward of said wear bar, said first width being greater than said second width and said third width and said second width being greater than said third width.

21. A ski for a snowmobile comprising a body having a substantially horizontal snow contacting section and an upturned forward leading portion, said body having an upper surface and a lower surface, a passage extending through said body from said lower surface to said upper surface, said passage configured to remain substantially open after said ski is mounted to a snowmobile, said leading portion and said snow contacting portion meeting at a junction, a keel depending downward from said body, said keel increasing in width from said tip to said junction and said keel decreasing in width rearward of said junction.

22. The ski of claim 21, wherein said passage extends through at least a portion of said keel.

23. The ski of claim 22, wherein said passage extends through a rear portion of said keel.

24. The ski of claim 21, wherein said keel comprises a central recess adapted to receive a wear bar.

25. The ski of claim 24 further comprising a wear bar mounted within said central recess.

26. The ski of claim 25, wherein said wear bar has a substantially uniform cross-section along its length.

27. The ski of claim 21, wherein said keel comprises a forward half and a rearward half and said keel does not expand in width along any portion of said rearward half.

* * * * *

UNITED STATES PATENT AND TRADEMARK OFFICE
CERTIFICATE OF CORRECTION

PATENT NO.     : 6,378,889 B1
DATED          : April 30, 2002
INVENTOR(S)    : Moriyama et al.

It is certified that error appears in the above-identified patent and that said Letters Patent is hereby corrected as shown below:

<u>Column 9,</u>
Line 16, change the word "bear" to -- bar --

Signed and Sealed this

Eleventh Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,378,889 B1
DATED : April 30, 2002
INVENTOR(S) : Takashi Moriyama and Takuji Nakano It is certified that error appears in the above-identified patent and that said Letters Patent is hereby corrected as shown below:

<u>Column 9,</u>
Line 8, replace "second" with -- first --

Signed and Sealed this

Twenty-eighth Day of September, 2004

JON W. DUDAS
*Director of the United States Patent and Trademark Office*